June 19, 1923.

J. M. LÓPEZ

ROLLER DISTRIBUTOR

Filed July 29, 1921

1,459,109

J. M. López, Inventor

By C. A. Snow & Co.
Attorney

Patented June 19, 1923.

1,459,109

UNITED STATES PATENT OFFICE.

JESÚS M. LÓPEZ, OF SAN ANTONIO, TEXAS.

ROLLER DISTRIBUTOR.

Application filed July 29, 1921. Serial No. 488,356.

*To all whom it may concern:*

Be it known that I, JESÚS M. LÓPEZ, a citizen of the Republic of Mexico, residing at San Antonio, in the county of Bexar and State of Texas, have invented a new and useful Roller Distributor, of which the following is a specification.

The device forming the subject matter of this application is a distributor embodying a flexibly and eccentrically mounted part, the distributor being of that sort commonly used on a Ford car, and the invention aims to provide novel means whereby friction will be reduced, and, particularly, to provide novel spring means for holding the concentric ball races of the distributor eccentrically upon a shaft. The invention aims, further, to provide novel means whereby an adequate electrical contact between the races will be secured.

It is within the province of the disclosure to improve generally and to enhance the utility of devices of that type to which the invention appertains.

Within the scope of what is claimed, a mechanic may make changes in the precise embodiment delineated and described, without departing from the spirit of the invention, placing the utility thereof in jeopardy, or avoiding the charge of infringement.

Figure 1:
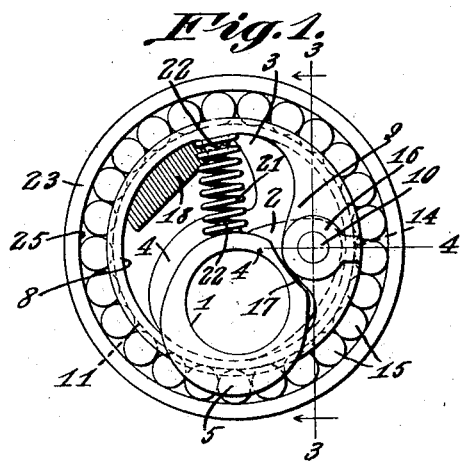
Figure 2:
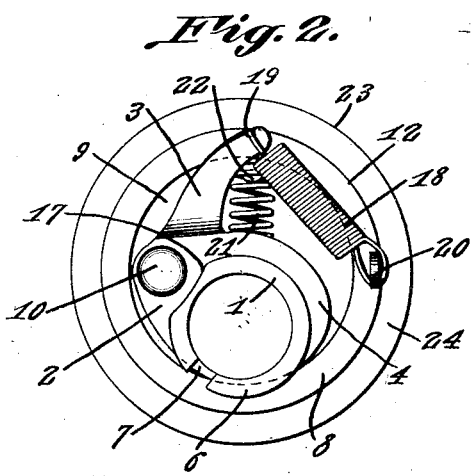
Figure 3:
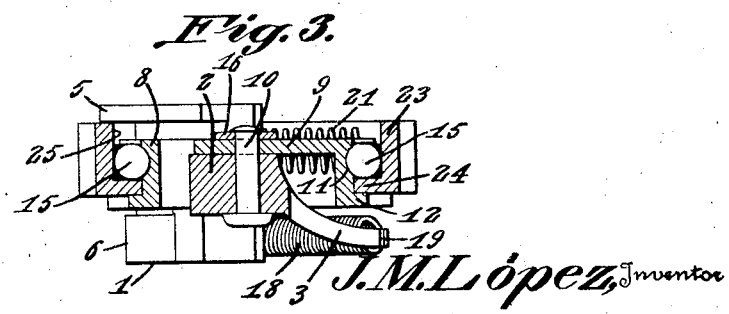
Figure 4:
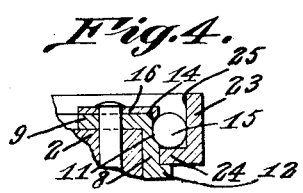

In the drawings:—Figure 1 is an elevation showing one end of a distributor constructed in accordance with the invention; Figure 2 is an elevation showing the opposite end of the distributor; Figure 3 is a section on the line 3—3 of Figure 1; Figure 4 is a fragmental section on the line 4—4 of Figure 1.

In carrying out the invention, there is provided a carrier 1, in the form of a collar, and adapted to be mounted on the timing shaft of an internal combustion engine. The carrier 1 is provided with a lug 2, from which an arm 3 projects circumferentially and outwardly, as shown in Figure 2. A flange 4 is formed integrally with the arm 3 and the carrier 1, and extends part way around the carrier, as shown in Figure 2. At one end, the carrier is supplied with a flange 5, there being a flange 6 at the other end of the carrier, both of these flanges extending part way around the carrier. In one end, the carrier 1 is supplied with a notch 7, facilitating the connection of the carrier with the timing shaft (not shown).

The numeral 8 marks an inner ball race, located about the carrier 1 and adapted to be received between the flanges 5 and 6 thereof, as a comparison of Figures 1 and 2 will show. The inner ball race 8 is provided with an inwardly projecting wing 9, overlapped on the lug 2 of the carrier 1, a pivot element 10 being mounted in the lug and in the wing 9, the carrier 1 thus being mounted to swing on the inner ball race 8. In its periphery, the inner ball race 8 is provided with a circumferential groove 11, the race having, at one end, an outwardly extended annular flange 12. In one end of the inner ball race 8 there is a notch 14, communicating with the groove 11, to the end that anti-friction elements, such as balls 15, may be introduced into the groove. After the balls 15 are in place, the notch 14 is closed by a stop 16, a portion of which is overlapped on the wing 9, as shown in Figure 1. The pivot element 10 engages said portion of the stop 16 and holds the stop in place. In order to facilitate the mounting of the stop 16 and the insertion of the pivot element 10, it may be expedient to cut away the carrier 1, at its ends, as denoted by the numeral 17.

A means is provided for holding the carrier 1 yieldingly in eccentric relation to the race 8. Having this consideration in mind, one end of a retractile spring 18 is engaged in a notch 19 formed in the arm 3 of the carrier 1, relatively near to the outer end of the arm, the other end of the spring being connected to a hook or the like, denoted by the numeral 20, and carried by the inner race 8 at one end thereof. Further, a compression spring 21 is introduced between the carrier 1 and the inner race 8, these parts having lugs 22 which receive the ends of the spring. The spring means for holding the carrier 1 yieldingly in eccentric relation to the race 8 form one of the salient features of the invention, since, so far as I am advised as to the state of the art, no one hitherto has proposed to secure the result mentioned, through the instrumentality of tension and compression springs, acting simultaneously.

The inner ball race 8 is located within an outer ball race 23, the race 23 having a smooth inner surface 25. By "smooth" I mean that there is, in the inner surface of the outer ball race 23, no groove corresponding to the groove 11 of the inner ball race 8. The construction shown and described is of advantage, because, if the balls 15 roll on a smooth surface, such as that shown at 25, rather than in a groove, a better electrical contact results. The outer ball race 23 is supplied at one end with an inwardly extended annular flange 24, overlapped on the flange 12 of the inner ball race 8 and in contact therewith. The flange 24 has two functions. First, cooperating with the flange 12, it affords an extended contact area, independent of the balls 15, the electrical contact between the races 8 and 23 being improved accordingly. Second, the flange 24, being interposed between the flange 12 and the balls 15, prevents the outer ball race 23 from moving endwise, out of engagement with the balls, the foregoing being obviously true, in view of the fact that the outer ball race 23, as shown in Figure 4, has no internal groove, corresponding to the external groove 11 of the inner ball race.

The flange 4 serves as a reinforcement for the carrier or collar 1.

The operation of the structure will be understood clearly by those skilled in the art, it being necessary to state, merely, that the springs 18 and 21 hold the races 8 and 23, yieldingly, in eccentric relation to the carrier 1, the outer race 23 sweeping across the contact members of the casing of the distributor.

I claim:—

1. In a device of the class described, a carrier; an annular member disposed about the carrier and pivoted thereto; and compression and retractile springs operating simultaneously to hold the annular member yieldingly in eccentric relation to the carrier.

2. In a device of the class described, a carrier having an outstanding arm; an annular member disposed about the carrier and pivoted thereto; and a retractile spring connected to the arm and the annular member, and constituting means for holding the annular member yieldingly in eccentric relation to the carrier.

In testimony that I claim the foregoing as my own, I have hereto affixed my signature in the presence of two witnesses.

JESÚS M. LÓPEZ.

Witnesses:
F. L. SEARCH,
MASON B. LAWTON.